Patented Oct. 24, 1933

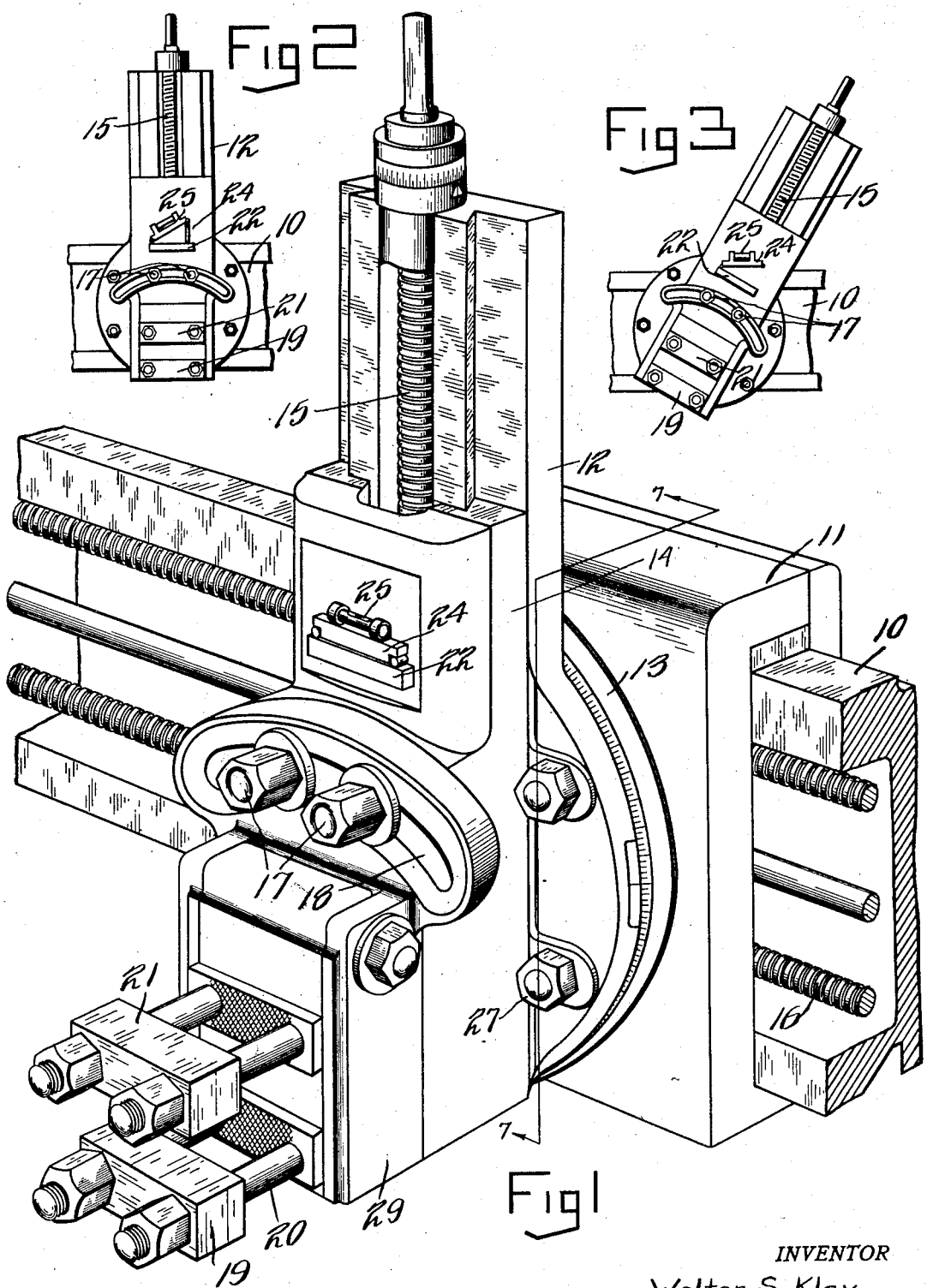

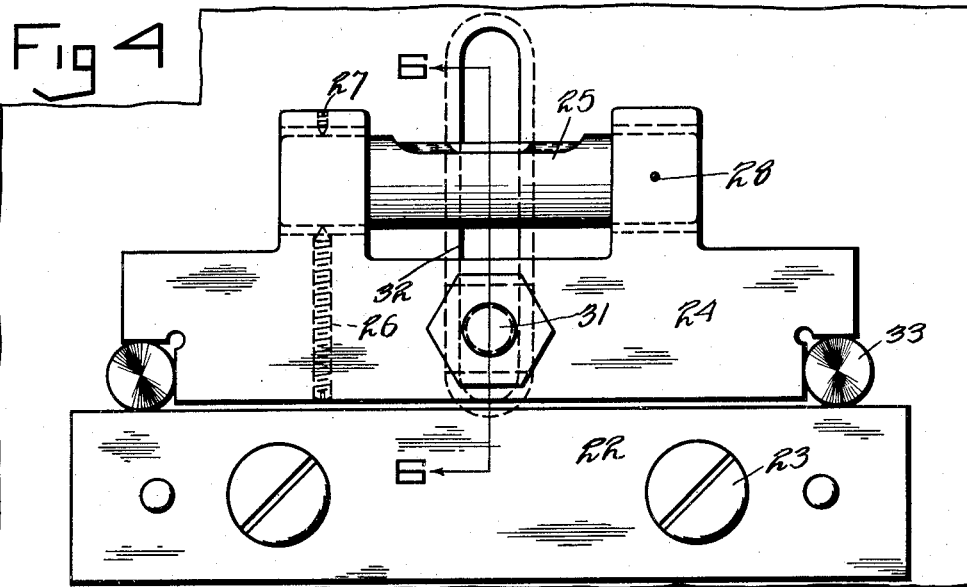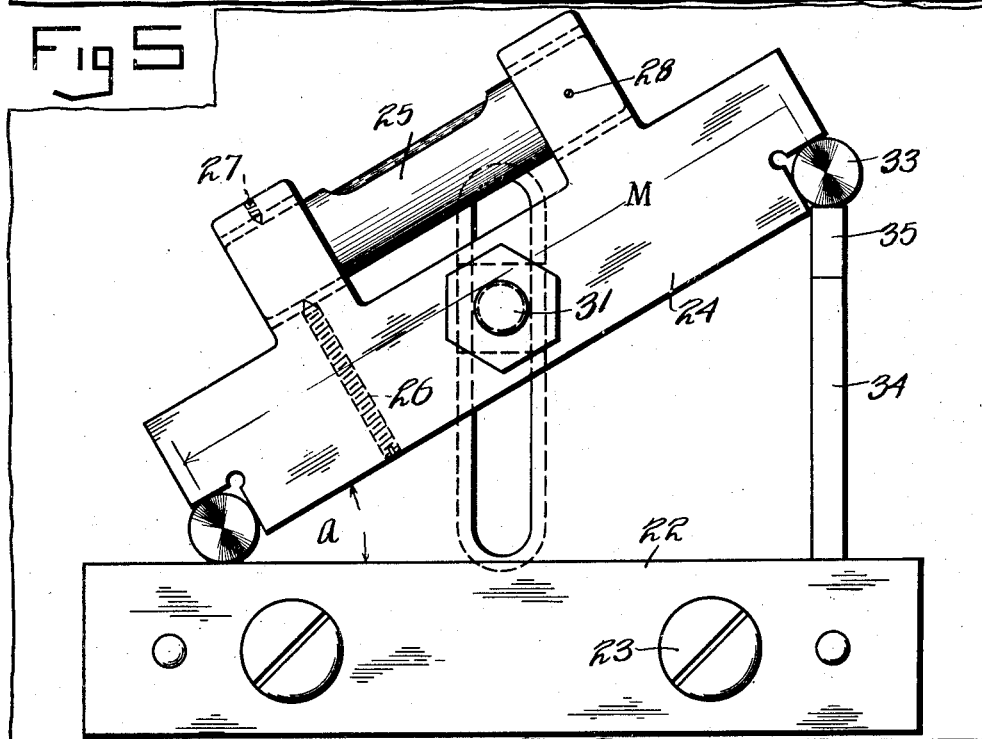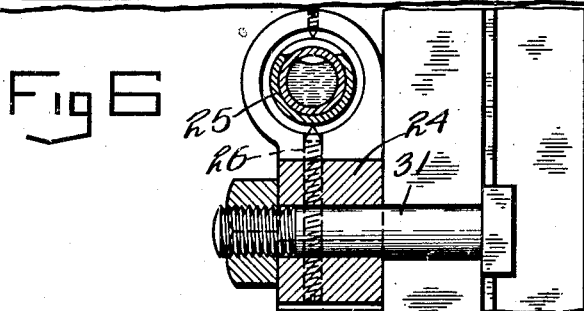

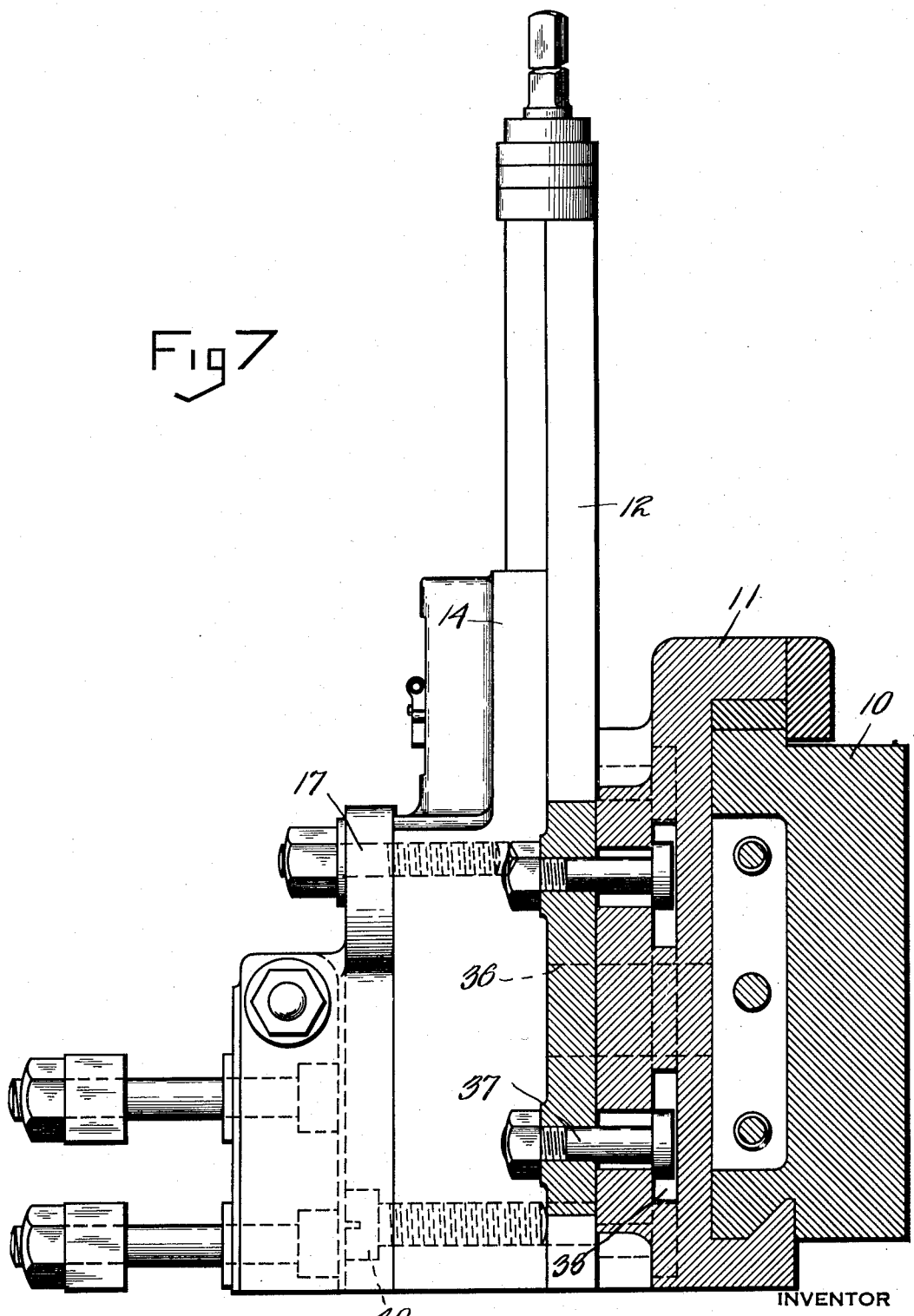

1,931,730

UNITED STATES PATENT OFFICE 1,931,730

MEANS FOR SETTING PLANER HEADS

Walter Sidney Klay, Waynesboro, Pa., assignor to Landis Tool Company, Waynesboro, Pa., a corporation of Pennsylvania Application December 10, 1930
Serial No. 501,382

3 Claims. (Cl. 90—52)

This invention relates to devices for setting planer heads at a desired angle to position the working tool at the proper angle to correctly machine the surface of the work.

An object of the invention is to provide means whereby the planer head may be adjusted and to eliminate any cut and try methods of setting a head such as have been heretofore necessary.

Referring to the accompanying drawings, which are made a part hereof and on which similar reference characters indicate similar parts, Figure 1 is a perspective view of a planer head and its mounting, Figure 2 a front elevation showing the head in vertical position with some of the elements shown in Figure 1 omitted, Figure 3 is a front elevation similar to Figure 2 with the head positioned at an angle.

Figure 4 is a front elevation of a sine bar used in connection with my invention, the sine bar being in horizontal position, Figure 5 a view of the sine bar positioned at an angle, Figure 6 a section on line 6—6 of Figure 4, and Figure 7 a section on line 7—7 of Figure 1.

In the drawings reference character 10 indicates a planer cross rail having a saddle 11 slidably mounted thereon and having a harp 12 mounted on the saddle, 13 indicates the dial for swivelling the head and 14 indicates a vertically movable slide, which slide is adjustable longitudinally of the rail by means of screw 16 and is adjustable vertically by means of screw 15. The harp 12 is pivoted on a pin 36 on which it may oscillate and is secured in adjusted position by means of bolts 37 having their heads seated in arcuate slots 38 in the saddle 11. A support 29 for the tool, not shown, is mounted on the slide by means of a bolt 30 about which the support may oscillate and is secured in adjusted position by means of bolts 17. A slot 18 in the support 29 permits the necessary rotary adjustment to position the tool as desired. The working tool, not shown, is received in a recess between bolts 20 and is held in position by means of clamps 19 and 21 which are slidably positioned on these bolts. The working tool is manually fed downward by means of the screw 15. It is necessary therefore that the head shall be positioned exactly at the angle at which the work is to be machined or planed. Means for setting the planer head at the correct angle will now be described.

The means for positioning the head at the angle at which it is to be set consists of what is usually termed a sine bar. This consists of a base bar 22 which may be secured to the front face of slide 14 by means of bolts 23. An adjustable arm 24 is secured by means of a bolt 31 which passes through a slot 32 on the slide 14. A spirit level 25 is secured upon the arm 24. Screws 26 and 27 serve to adjust one end of the spirit level vertically and similar screws 28 serve to adjust the other end laterally to position it in perfect alinement with the arm 24. The arm 24 carries rollers or pins 33 which seat in notches at each end of the arm. Gauge blocks 34 and 35 are used to support one end of the arm while the other end rests upon the base 22. The arm 24 is positioned at the angle at which the planer tool is to move with respect to a vertical plane. The following method is employed in positioning the arm 24 at the correct angle. The arm 24 is cut at a convenient length preferably an even number of units of length and for convenience in calculating we will assume that the distance $m$ between the centers of rollers 33 is ten inches. We will further assume that it is desired that the angle $a$ shall be 30 degrees and 46 minutes; we then wish to know the length of the blocks 34 and 35 which will give us the desired angle at $a$. To do this the operator refers to a table of sines to find the sine of the angle 30 degrees and 46 minutes. He finds that the sine of this angle is .5116; this number multiplied by the length $m$ or ten inches will give him 5.116 which will be the combined length of gauge blocks 34 and 35.

In operation standard gauge blocks of even length may be used and it is therefore a small matter to position the arm 24 at the desired angle and to secure it in position by means of the bolt 31. This will position the spirit level substantially in the position shown in Figure 2. The operator then loosens the bolts 37 and swings the head to the position shown in Figure 3 until the bubble in the spirit level indicates that the bar 24 is perfectly level. The harp 12 will then be positioned at the correct angle which is the angle of the plane of the work to be machined or cut.

It will be obvious to those skilled in the art that various changes may be made in my device without departing from the spirit of the invention and therefore I do not limit myself to what is shown in the drawings and described in the specification, but only as indicated by the appended claims.

Having thus fully described my said invention, what I claim as new and desire to secure by Letters Patent, is:

1. Means for determining the angular position of a planer head comprising a straight edge adapted to be secured to the planer head in fixed position, a sine bar pivotally mounted on the planer head and having one end resting on said straight edge, said sine bar adapted to cooperate with a block of predetermined length which can be placed in an upright position on the straight edge with a free end of the sine bar positioned upon it, and a spirit level mounted on the sine bar, the said block of predetermined length determining the angular position of the sine bar whereby when the planer head is adjusted to bring the sine bar in a level position said planer head will be positioned at an angle determined by the length of the said block of predetermined length, substantially as set forth.

2. Means for determining the angular position of a tool support comprising a straight edge adapted to be secured to the said support, a bar adapted to be secured on the support in an angular position with one end in contact with the surface of the straight edge and having its other end adapted to rest upon a gauge block of predetermined length which can be placed in an upright position on the straight edge, and a spirit level mounted on the sine bar, the said block determining the angular position of the sine bar, movement of the tool holder to bring the sine bar in a level position serving to locate the said tool holder in the desired angular position, substantially as set forth.

3. A device of the kind described for positioning a tool support at a predetermined angle comprising a straight edge mounted upon the support and having a known angular position on the support, a sine bar pivotally mounted upon the straight edge, said sine bar having a spirit level mounted therein, said sine bar adapted to cooperate with a gage block having a desired known length which can be placed upon the straight edge so that the said sine bar has one end resting upon the said block, the block determining the angular position of the sine bar, the said tool support being pivotally mounted to swing to a position at which the spirit level will indicate when the sine bar is level at which time the tool support will be positioned at the predetermined angle, substantially as set forth.

WALTER SIDNEY KLAY.